Oct. 17, 1939. W. L. CHURCH Re. 21,234
PIPE CUTTER
Original Filed March 27, 1934
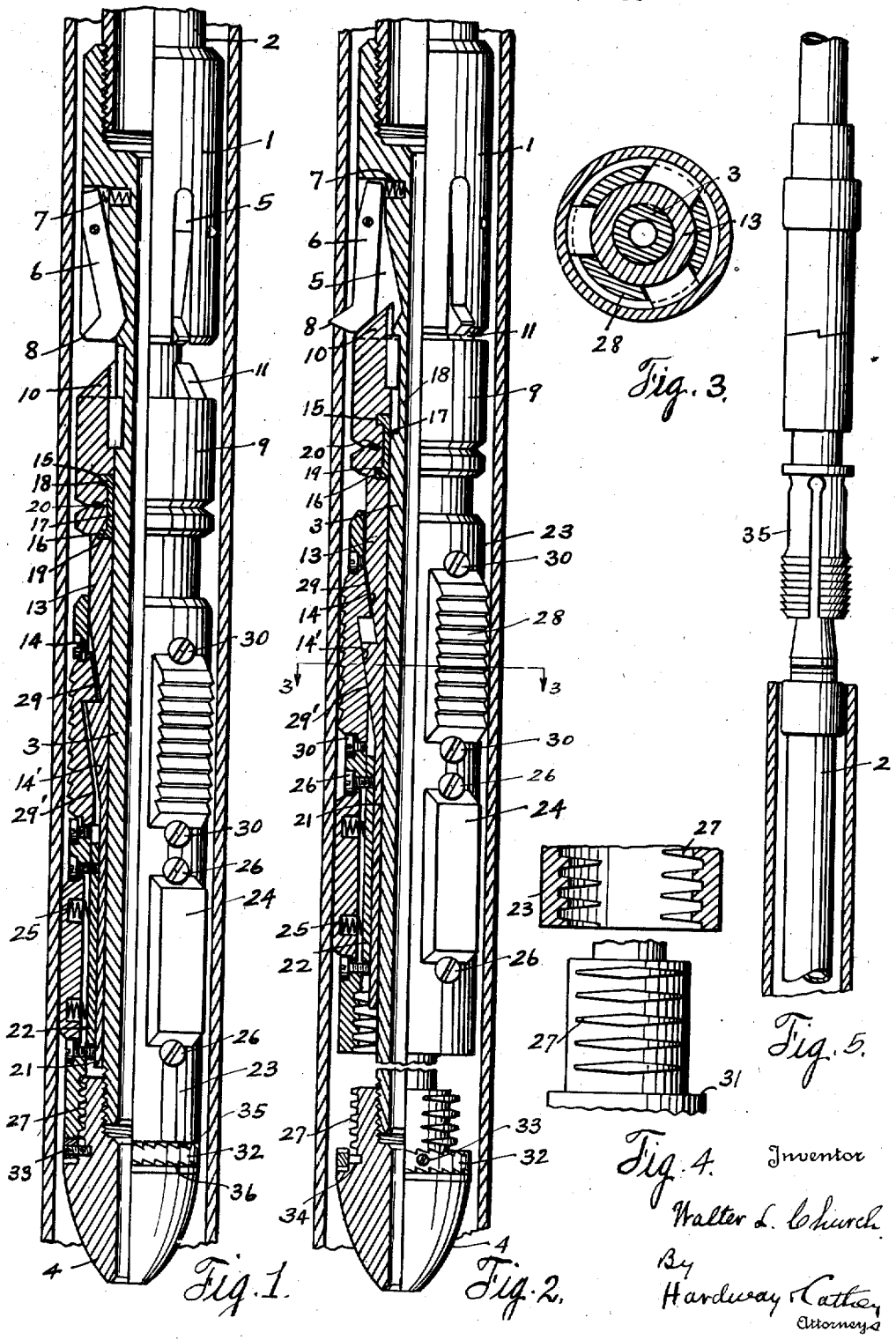
Inventor
Walter L. Church
By Hardway & Cathey
Attorneys Reissued Oct. 17, 1939

Re. 21,234

UNITED STATES PATENT OFFICE 21,234

PIPE CUTTER

Walter L. Church, Houston, Tex., assignor to C-M-P Fishing Tool Company, Houston, Tex., a corporation of Texas Original No. 2,066,767, dated January 5, 1937, Serial No. 717,570, March 27, 1934. Application for reissue December 10, 1937, Serial No. 179,181

5 Claims. (Cl. 285—149)

This invention relates to a pipe cutter.

An object of the invention is to provide an inside pipe cutter of the type adapted to cut by rotation and embodying novel means for maintaining the cutters in active or inactive positions.

Another object is to provide in a pipe cutter novel means for anchoring the tool in the pipe to be cut and of such construction that the anchoring means may be engaged and released at will upon rotation of the operating string in a selected direction.

The invention also embodies novel means for connecting the cutter expanding means to the jaw expanding means whereby they will be permitted to revolve or swivel relative to each other; novel means for frictionally engaging the sleeve with the pipe to be cut to permit expansion of the jaws as well as novel means for preventing the expansion of the jaws when the tool is in inactive or non-cutting position.

The invention also embodies certain improvements over that type of inside pipe cutter disclosed in my co-pending application filed on March 27, 1934, under Serial No. 717,570.

With the above and other objects in view, this invention has particular relation to certain novel features of construction, operation and arrangement of parts, an example of which is given in this specification and illustrated in the accompanying drawing, wherein:

Figure 1 shows a side view of the cutter, partly in section, shown in inactive position and located in the pipe to be cut.

Figure 2 shows a similar view to that shown in Figure 1 showing the cutter in active position.

Figure 3 shows a cross-sectional view taken on the line 3—3 of Figure 2.

Figure 4 shows an enlarged sectional view of a type of connection employed, and

Figure 5 shows a fragmentary side view of the operating stem showing a type of pipe puller to be used for pulling the cut pipe.

Referring now more particularly to the drawing wherein like numerals of reference designate the same parts in each of the figures, the numeral 1 designates the tubular cutter body which may be attached to the lower end of the operating string 2 and which is reduced and extended forming the tubular mandrel 3. Attached to the lower end of the mandrel there is a suitable guide 4. The lower end of the body proper has the external blade slots 5 wherein are pivoted the swinging blades 6. The upper ends of these blades are extended above their pivots and are seated against the outwardly working springs 7 in the body which normally hold the blades retracted. The lower ends of the blades have the outwardly directed points, or bits, 8. Any suitable type of blades or cutters may be employed.

On the mandrel beneath the cutter body there is a wedge ring 9 whose upper end is formed with the upwardly extended, wedge like blade actuators 10 having the external downwardly flared faces 11 and the blades have the corresponding beveled inside faces 12 which may ride on the faces 11 to expand the blades. The ring 9 is suitably splined on the mandrel 3.

On the mandrel beneath the wedge ring 9 there is a jaw expander 13, having the upper and lower upwardly flared faces 14, 14'. The adjacent ends of the ring 9 and expander 13 have the internal annular grooves 15, 16, respectively, and there is an inside coupling ring 17 having the outside ribs 18, 19 which run in said grooves whereby the wedge ring may turn relative to the expander 13. A suitable bearing ring 20 may be interposed between said wedge ring and expander if desired.

The expander 13 has the tubular extension 21 which fits loosely over the mandrel 3 and a sleeve-like liner 22 has a sliding fit on said extension. Around the expander 13 and the extension 21 thereof there is a sleeve 23 into which the liner 22 is driven and in the lower end of which are mounted the radial gripping members 24 which are seated on the coil springs 25. The inner ends of said springs rest against said liner. The ends of said gripping members engage the heads of the set screws 26 which are screwed into the sleeve 23. The guide 4 and sleeve 23 may be connected by the special mutilated threads 27 more particularly hereinafter described.

Mounted in the upper end of the sleeve 23 are the radially movable slip jaws 28 whose inner sides have the tapering upper and lower faces 29, 29' which conform to the shape of and ride against the faces 14, 14'. The outer surfaces of these slip jaws are toothed. These jaws work through suitable slots in the sleeve 23 and their ends engage the heads of set screws 30, screwed into said sleeve, whereby the jaws are retained in place.

The mutilated intermeshing threads 27 which connect the sleeve 23 and guide 4 are more accurately shown in Figure 4. The threads of both the sleeve and guide are tapered each way, that is to the right and left as shown so that they may be connected and/or disconnected by a one way rotation of one of the connected parts. The threads 27 form a very convenient type of connection between the guide 4 and sleeve 23 although some other type of equivalent connecting and disconnecting means might be employed with satisfactory results.

In operation the cutting tool, as shown in Figure 1, is lowered in the pipe to be cut to the point selected for the cut. While being lowered the gripping members 24 are in frictional engagement with the inside of the pipe and the lower end of the extension 21 rests on the upper end of the guide 4 so that the jaw expander 13 cannot expand the jaws 28 while the tool is being lowered. When the tool is located at the selected place the operating string 2 and mandrel 3 may be turned to the right and meanwhile lowered and the guide 4 will be gradually screwed out of and detached from the lower end of the sleeve 23, said gripping members meanwhile holding said sleeve stationary.

The mandrel 3 and expander 13, may then move downwardly relative to the slip jaws and said jaws will be expanded into engagement with the pipe to be cut and the tool will thereby be anchored in place and the blades will be actuated outwardly by the actuators 10 into engagement with the inside of the pipe. The operating string may now be rotated and gradually lowered and the blade bits 8 will be gradually forced outwardly until the pipe is severed.

The string 2 and mandrel 3 may now be elevated and turned to the right and with a tension maintained on the string the threads 27 will again engage and the guide may thus be reattached to the sleeve 23.

The threaded end of the guide 4 is reduced thus forming the external, annular shoulder 31, and around the reduced portion and resting on said shoulder there is a ratchet ring 32 which is rotatable on the guide but is retained thereon by the pin 33 which is threaded through said ring and whose inner end projects into a corresponding annular groove 34 in the guide.

The ratchet ring 32 has the upper and lower series of oppositely pitched ratchet teeth 35, 36 adapted to engage the lower end of the sleeve 23 and the shoulder 31, respectively, to prevent the plug 4 from becoming too tightly screwed into said sleeve.

When the guide is reattached to the sleeve 23 the expander 13 will be maintained in its upper or released, position to release the jaws 28 and said jaws may then move inwardly to release the pipe. The body 1 will also have moved upwardly to carry the blades 6 clear of the blade actuators and the blade bits will be retracted by the springs 7 to clear the cut off section of the pipe.

The tool may then be lowered to carry the grapple, or fishing tool 35, carried by the operating string, down into the cut off section to pull the same from the well, if the same can not be pulled, the cutting tool may be relocated therein and another cut made.

What I claim is:

1. In combination two connected parts having threads adapted to be intermeshed, said threads forming the sole means for maintaining the parts connected and being shaped to be engaged upon relative longitudinal movement of the parts in one direction and simultaneous relative rotation of said parts and to be released upon relative longitudinal movement of said parts, in the other direction upon a continuation of said relative rotation thereof in the same direction.

2. In combination two connected parts being connected solely by mutilated threads adapted to be intermeshed and separated, said threads being shaped to intermesh upon axial movement of said parts during relative rotation thereof and to disengage when axially moved relative to each other in the other direction upon continuation of such rotation in the same direction.

3. In a pipe cutter adapted to cut by rotation in a well; a mandrel, a guide and a sleeve, said guide and sleeve having threads adapted to intermesh and shaped to be interengaged and released by a one-way rotation of the mandrel and guide, relative to the sleeve and forming the sole connecting means for said parts.

4. In a pipe cutter adapted to cut a pipe in a well by rotation and comprising a stationary part and a movable part; threads formed on both parts whereby said parts may be connected and disconnected, said threads being mutilated and tapered each way and being thus shaped and arranged to be engaged by the rotation of the movable part relative to the other part in one direction and to be disengaged by a continuation of the rotation of the movable part in the same direction, said rotatable part being movable downwardly relative to the other part when the threads are disconnected.

5. In a pipe cutter adapted to cut by rotation in a well; a mandrel, a guide and a sleeve, said guide and sleeve having right- and lefthand threads adapted to intermesh and arranged to be interengaged upon upward movement and rotation of the guide and to be disengaged by a continuation of said rotation in the same direction and simultaneous downward movement of the guide whereby said threads may be connected and disconnected by a one-way rotation of the guide relative to the sleeve.

WALTER L. CHURCH.